(12) United States Patent
Yoon et al.

(10) Patent No.: US 12,637,152 B2
(45) Date of Patent: May 26, 2026

(54) ACTIVE AIR SKIRT APPARATUS

(71) Applicants: Hyundai Motor Company, Seoul
(KR); Kia Corporation, Seoul (KR);
HYUNDAI MOBIS CO., LTD., Seoul
(KR)

(72) Inventors: Jin Young Yoon, Gimpo-Si (KR);
Chang Young Lee, Yongin-Si (KR);
Hong Heui Lee, Suwon-Si (KR); **Geon
Hwi Lim, Seoul (KR); Dong Eun Cha**,
Hwaseong-Si (KR); Myung Eun Kim,
Suwon-Si (KR); Jae Sup Byun,
Seongnam-Si (KR); Jang Ho Kim,
Seoul (KR)

(73) Assignees: Hyundai Motor Company, Seoul
(KR); Kia Corporation, Seoul (KR);
Hyundai Mobis Co., Ltd., Seoul (KR)

( * ) Notice: Subject to any disclaimer, the term of this
patent is extended or adjusted under 35
U.S.C. 154(b) by 340 days.

(21) Appl. No.: 18/387,373

(22) Filed: Nov. 6, 2023

(65) Prior Publication Data

US 2024/0400139 A1     Dec. 5, 2024

(30) Foreign Application Priority Data

May 31, 2023     (KR) ........................ 10-2023-0070391

(51) Int. Cl.
*B62D 35/02*          (2006.01)
(52) U.S. Cl.
CPC ................................... *B62D 35/02* (2013.01)
(58) Field of Classification Search
CPC .... B62D 35/02; B62D 35/002; B62D 35/001;
B62D 35/005; B62D 35/008; B62D
37/02; B62D 37/04; B60R 19/48

USPC .................................. 296/180.1, 2; 293/117
See application file for complete search history.

(56) References Cited

U.S. PATENT DOCUMENTS

| | | | | | |
|---|---|---|---|---|---|
| 2,337,632 | A | * | 12/1943 | Winser | ..................... B60H 1/26 |
| | | | | | 454/145 |
| 4,951,994 | A | * | 8/1990 | Miwa | ................... B62D 35/005 |
| | | | | | 296/180.1 |
| 5,054,377 | A | * | 10/1991 | Mochel | .................. B60H 1/262 |
| | | | | | 296/217 |
| 9,102,366 | B1 | * | 8/2015 | Kim | ..................... B62D 35/005 |
| 9,193,246 | B2 | * | 11/2015 | Wood | ..................... B60H 1/245 |

(Continued)

FOREIGN PATENT DOCUMENTS

| | | | | | |
|---|---|---|---|---|---|
| DE | 102013016508 | A1 | * | 4/2015 | ........... B62D 35/005 |
| DE | 102016123140 | A1 | * | 6/2017 | ........... B62D 35/005 |

(Continued)

*Primary Examiner* — Amy R Weisberg
(74) *Attorney, Agent, or Firm* — MORGAN, LEWIS &
BOCKIUS LLP

(57)          ABSTRACT

An active air skirt apparatus includes a base fixed to a
vehicle body; a link portion including a plurality of links
connected to be rotatable in a transverse direction; a drive
portion mounted on the base, connected to the links of the
link portion, and configured to generate rotational power to
rotate the plurality of links; and a skirt provided on the base
to be movable in an upward and downward direction and
connected to the links of the link portion, the skirt being
configured to be moved to a retracted position when the
plurality of links is folded by operation of the drive portion,
and moved to an extended position when the plurality of
links is unfolded.

16 Claims, 7 Drawing Sheets

(56)          References Cited

U.S. PATENT DOCUMENTS

| 12,434,777 B2 * | 10/2025 | Yoon | ....................... | B62D 37/02 |
| 2013/0238198 A1 * | 9/2013 | Prentice | ................ | B62D 35/02 |
| | | | | 296/180.1 |
| 2023/0339553 A1 * | 10/2023 | Yoon | ....................... | B62D 37/02 |
| 2024/0132166 A1 * | 4/2024 | Yoon | .................... | B62D 35/005 |

FOREIGN PATENT DOCUMENTS

| KR | 10-2005-0099314 | | | 10/2005 | | |
| KR | 20200001850 | A | * | 1/2020 | ............ | B60R 19/48 |
| KR | 10-2021-0056601 | | | 5/2021 | | |
| WO | WO-8803104 | A | * | 5/1988 | | |

* cited by examiner

Mobility 400    400

1

ACTIVE AIR SKIRT APPARATUS

CROSS REFERENCE TO RELATED APPLICATION

The present application claims priority to Korean Patent Application No. 10-2023-0070391, filed on May 31, 2023, the entire contents of which is incorporated herein for all purposes by this reference.

BACKGROUND OF THE PRESENT DISCLOSURE

Field of the Present Disclosure

The present disclosure relates to an active air skirt apparatus that improves aerodynamic performance by controlling a flow of air flowing under a mobility vehicle.

Description of Related Art

A turbulent flow occurs as air in the atmosphere is compressed when a mobility vehicle travels at a high speed. The turbulent flow occurring as described above causes a problem of deterioration in stability and traveling performance of the mobility vehicle.

Recently, rear spoilers have been installed on the mobility vehicles to solve the problem. The rear spoiler modulates an airflow present rearward of the mobility vehicle and increases pressure that allows the mobility vehicle to be more stably lowered toward a road surface, improving traveling stability and traveling performance of the mobility vehicle that travels at a high speed.

The rear spoiler is provided at a rear side of the mobility vehicle, which limits a degree of design freedom. Once the rear spoiler is provided, the design of the rear spoiler is hardly changed. In case that the rear spoiler is applied to a high-grade mobility vehicle, there is a problem in that the installation of the rear spoiler degrades the design.

As described above, there are problems in that the technology related to the rear spoiler has a limitation in improving fuel economy, traveling stability, and aerodynamic performance of the mobility vehicle, and the shapes of the mobility vehicles or the specifications of the rear spoilers need to be changed to additionally improve the aerodynamic performance.

Therefore, recently, various spoiler devices have been provided at a lower side of the mobility vehicle to control an airflow, in addition to the rear spoiler.

An air skirt provided at the lower side of the mobility vehicle and configured to control an airflow has been developed. However, because the air skirt is also kept in a fixed state, there are problems in that the air skirt cannot cope with traveling situations, and the air skirt is damaged by colliding with the road surface.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to ensuring optimal aerodynamic performance by controlling an airflow flowing under a mobility vehicle in accordance with a traveling state of the mobility vehicle. The present disclosure is also directed to providing an active air skirt apparatus that improves durability and reliability by stably operating a skirt for controlling an airflow even when the mobility vehicle travels at a high speed.

To achieve the above-mentioned object, various aspects of the present disclosure are directed to providing an active air skirt apparatus including: a base fixed to a vehicle body; a link portion including a plurality of links connected to be rotatable in a transverse direction thereof; a drive portion mounted on the base, connected to the links of the link portion, and configured to generate rotational power to rotate the plurality of links; and a skirt provided on the base to be movable in an upward and downward direction and connected to the links of the link portion, the skirt being configured to be moved to a retracted position when the plurality of links is folded by operation of the drive portion, and moved to an extended position when the plurality of links is unfolded.

The base may include a recessed portion that defines a space in which the links of the link portion are accommodated and rotated.

The recessed portion may be formed in a front surface of the base, the link portion may be provided forward of the base, the drive portion may be provided on a rear surface of the recessed portion, and the drive portion may penetrate the recessed portion and be connected to the link portion.

The link portion may include a first link and a second link, the first link may be connected to the drive portion and rotate axially, the second link may be rotatably connected to the skirt, and the first link and the second link may be rotatably connected to each other.

A connection portion may be provided at an upper end portion of a center portion of the skirt, and the connection portion and the second link of the link portion may be rotatably connected.

A first cover may be coupled to the front surface of the base and formed to cover the recessed portion, and the first cover may include a through-hole penetrated by the connection portion.

A guide portion may be provided on the first cover and extend along the through-hole, the guide portion may be connected to an axial center portion of the first link and include a slit hole extending along the through-hole, and the connection portion and the second link may be rotatably connected while penetrating the through-hole and the slit hole.

The first and second links may be positioned to overlap each other when the skirt is retracted, the first and second links may press the skirt downward while being unfolded when the skirt is deployed, and the first and second links may be positioned to be vertically unfolded in a completely deployed state.

The skirt may have sliders extending upwards from upper end portions of first and second opposite sides of the skirt, and seating portions may be provided at first and second opposite sides of the base and extend upwards from lower end portions of the base so that the sliders are accommodated in the seating portions.

The seating portion may include a protrusion or a groove extending in an upward/downward direction, and the slider may include a groove or protrusion matched with the seating portion and extending in the upward and downward direction thereof.

Second covers may be coupled to two opposite sides of the base, and the second covers may be formed to surround the sliders inward when the second covers are coupled to the base.

The base may include a support portion bent downward and forward and extending, and the skirt may be positioned inside the support portion.

The support portion may be fastened and fixed to a vehicle body, a bumper, or an undercover, a plurality of mounting portions may be provided around the base, and the base may be fastened and fixed to the vehicle body, the bumper, or the undercover by the mounting portions.

The skirt may be divided into an upper end portion and a lower end portion, the upper end portion may be configured as a rigid body and connected to the link portion, and the lower end portion may be coupled to the upper end portion and configured to be elastically deformable.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
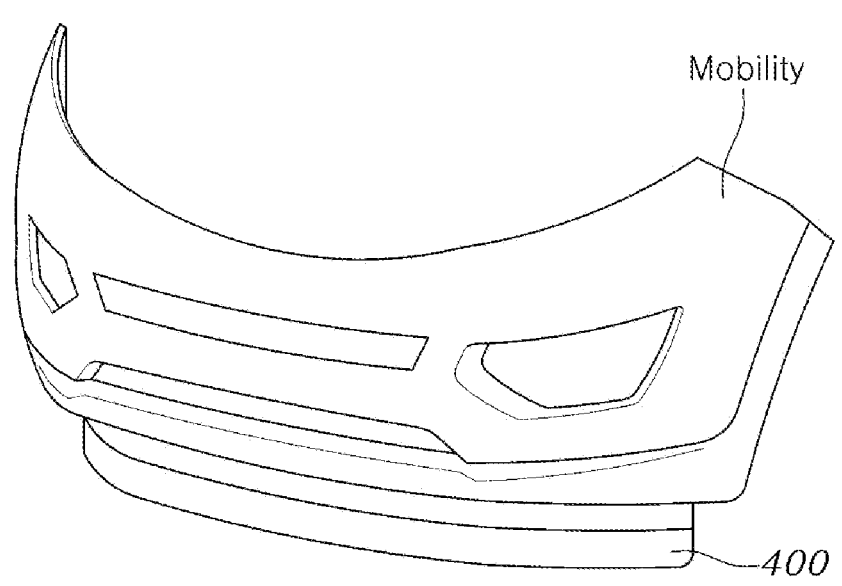
FIG. 1 is a view exemplarily illustrating a mobility vehicle and a skirt according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification. Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is referred to as being "coupled" or "connected" to another constituent element, it should be understood that one constituent element may be coupled or connected directly to another constituent element, and an intervening constituent element can also be present between the constituent elements. When one constituent element is referred to as being "directly coupled to" or "directly connected to" another constituent element, it should be understood that no intervening constituent element is present between the constituent elements.

Singular expressions include plural expressions unless clearly referred to as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an active air skirt apparatus according to various exemplary embodiments of the present disclosure will be described with reference to the accompanying drawings.

As illustrated in FIGS. 1 to 7, the active air skirt apparatus according to an exemplary embodiment of the present disclosure includes a base 100 fixed to a vehicle body, a link portion 200 including a plurality of links connected to be rotatable in a transverse direction, a drive portion 300 provided on the base 100, connected to the links of the link portion 200, and configured to generate rotational power to rotate the plurality of links, and a skirt 400 provided on the base 100 to be movable in an upward and downward direction and connected to the links of the link portion 200, the skirt 400 being configured to be moved to a retracted position when the plurality of links is folded by operation of the drive portion 300, and moved to an extended position by being pushed by the links when the plurality of links is unfolded.

The present disclosure ensures optimal aerodynamic performance by controlling an airflow flowing under a mobility vehicle.

The base 100 may be provided on a lower portion of the mobility vehicle and fixed to the vehicle body, a bumper, or an undercover. The link portion 200 and the drive portion 300 are provided on the base 100. The skirt 400 connected to the link portion 200 moves in the upward and downward direction depending on whether the drive portion 300 operates.

Figure 2:
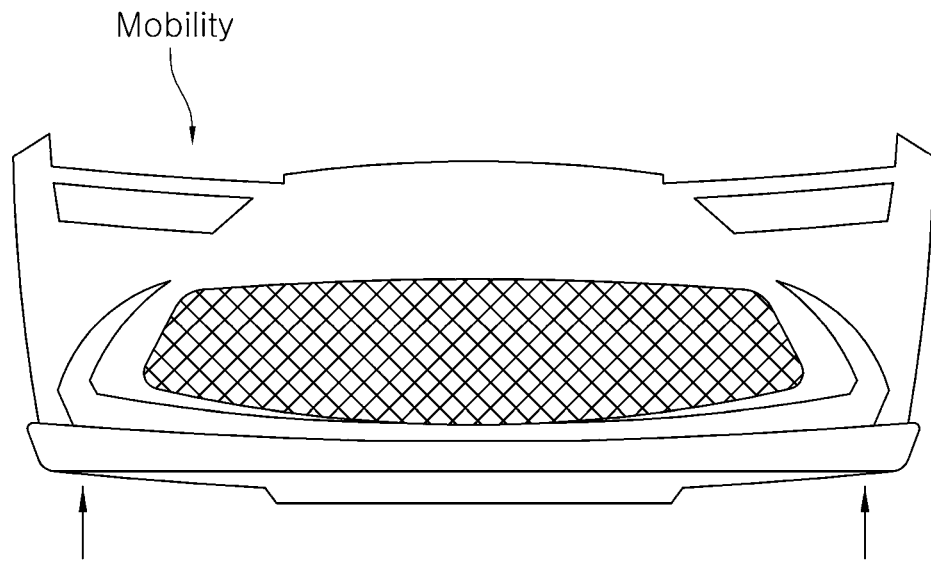
FIG. 2 is a view showing a state of the skirt stored in the mobility vehicle shown in FIG. 1.
Figure 3:
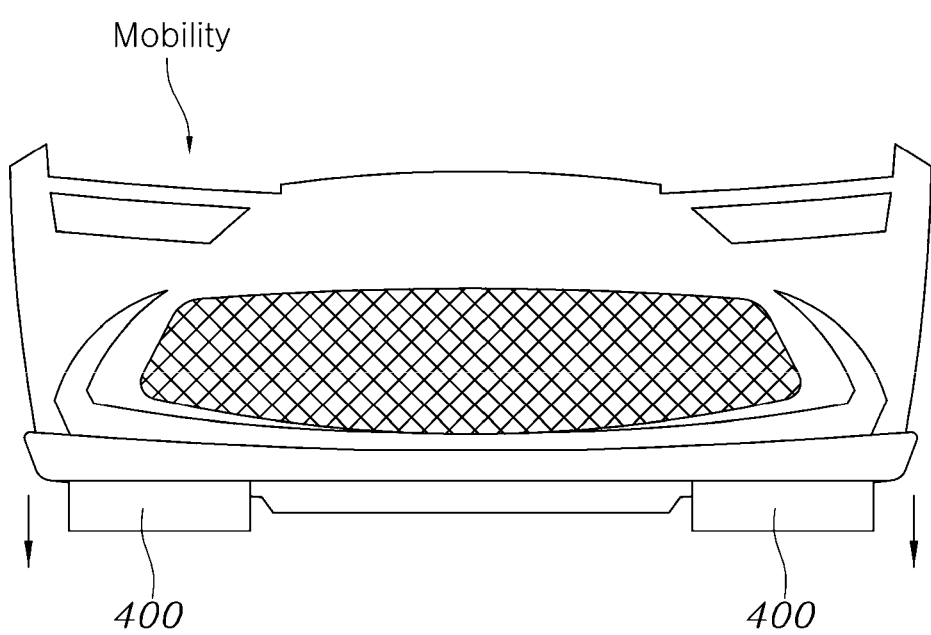
FIG. 3 is a view showing a state of the skirt pulled out from the mobility vehicle shown in FIG. 1.
Figure 4:
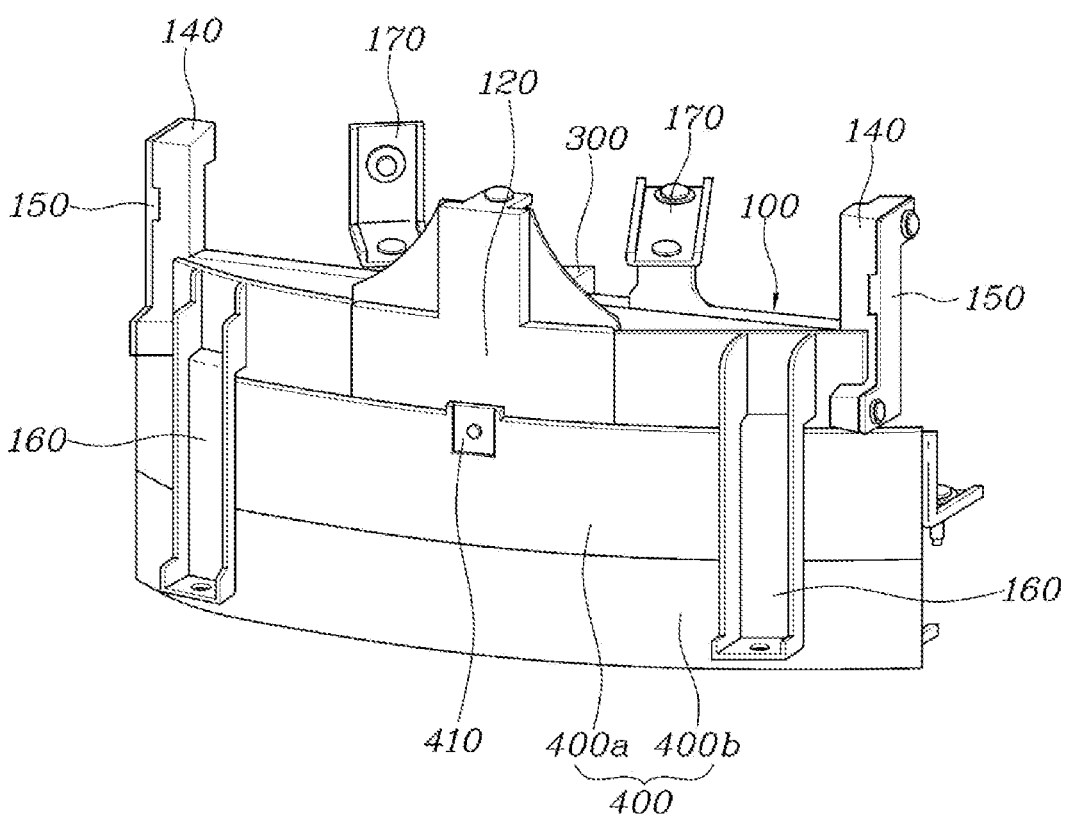
FIG. 4 is a view exemplarily illustrating an active air skirt apparatus according to various exemplary embodiments of the present disclosure.

Furthermore, as may be seen in FIG. 1, the base 100 includes a single unit disposed at the lower portion of the mobility vehicle and thereby a single skirt 400 is applied to the base 100, or as may be seen in FIG. 2 and FIG. 3, the base 100 includes a plurality of units disposed at the lower portion of the mobility vehicle and thereby the plurality of skirts 400 may be applied to the bases 100, respectively.

That is, the skirt 400 is accommodated when the skirt 400 is positioned at an upper side of the base 100. The skirt 400 is deployed by being moved downwards from the base 100 and reduces the airflow flowing under the mobility vehicle, improving aerodynamic performance of the mobility vehicle.

In the instant case, the drive portion 300 is provided on the base 100 and generates rotational power depending on whether the drive portion 300 operates, rotating the links of the link portion 200. The drive portion 300 may operate by receiving an instruction from a controller, and the controller may provide the drive portion 300 with instructions related to the operation of retracting or extending the skirt in consideration of a traveling environment such as a traveling speed of the mobility vehicle and a surrounding environment such as a state of a road surface in front of the mobility vehicle. The drive portion 300 may include a motor 310 and a speed reducer 320.

The link portion 200 is connected to the drive portion 300, the link portion 200 includes the plurality of links, and the links are connected to the drive portion 300 and the skirt 400. Therefore, the skirt 400 may move upward or downward as the links rotate in conjunction with one another when the rotational power is generated by the drive portion 300.

The link portion 200 is positioned at the upper side of the skirt 400, and the links of the link portion 200 are configured to rotate in the transverse direction thereof. Therefore, the skirt 400 is moved to the retracted position when the plurality of links is rotated and folded by the operation of the drive portion 300. Furthermore, the skirt 400 is moved to the extended position by being pushed by the links when the plurality of links is unfolded. Furthermore, the links of the link portion 200 are disposed on the base 100 and configured to rotate in the transverse direction so that rotation radii of the links are easily ensured, and an installation space is reduced in comparison with a structure in which the links rotate in a forward/rearward direction thereof.

Therefore, even though vehicle-induced wind is applied to the skirt 400 as the mobility vehicle travels, the skirt 400 moves straight as the links of the link portion 200 rotate so that operational stability and reliability of the skirt are ensured.

The present disclosure will be described in detail. A recessed portion 110 is formed in the base 100 and defines a space in which the links of the link portion 200 may rotate.

Figure 5:
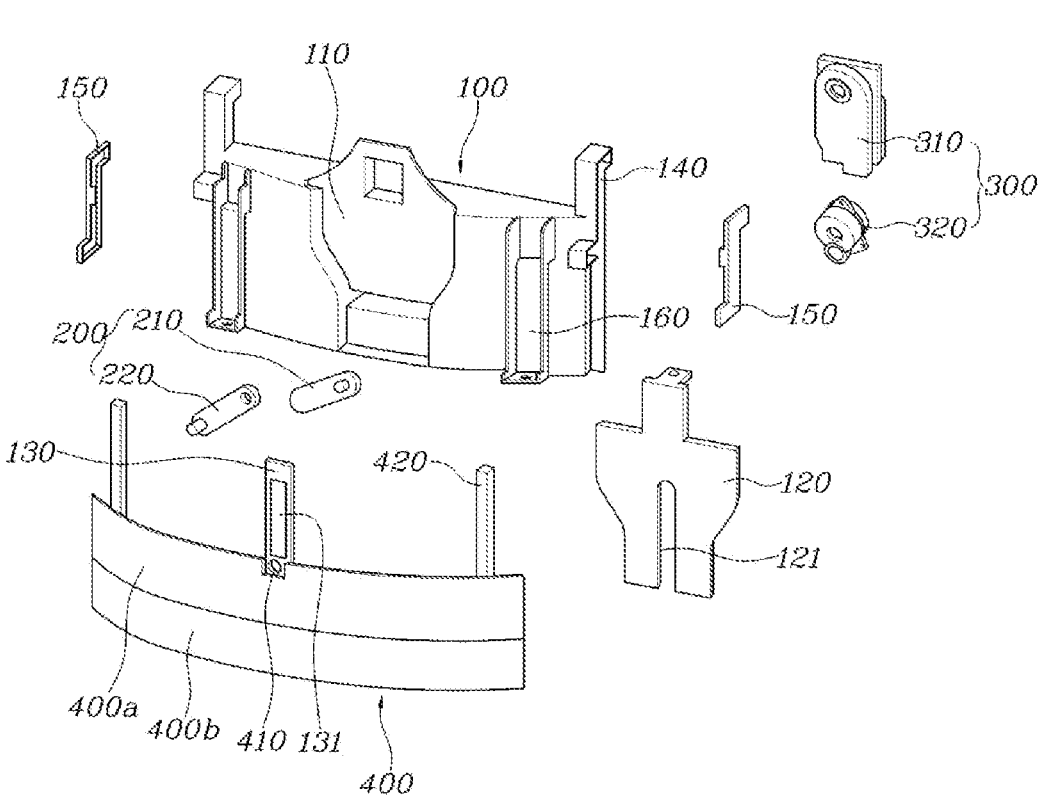
FIG. 5 is an assembled view of the active air skirt apparatus illustrated in FIG. 1.

As may be seen from FIG. 5, the recessed portion 110 may be formed by depressing a center portion of the base 100, and the recessed portion 110 may be formed to ensure the space in which the links of the link portion 200 may rotate. Therefore, the recessed portion 110 is depressed in the base 100 in a predetermined depth, and the link portion 200 is provided inside the recessed portion 110 so that the installation space for the link portion 200 may be reduced. No interference element is provided in the recessed portion 110 within operation radii by which the links of the link portion 200 rotate so that the rotation motions of the links may be stably performed.

Because the recessed portion 110 is formed in a front surface of the base 100 as described above, the link portion 200 may be provided forward of the base 100, and the drive portion 300 may be provided on a rear surface of the recessed portion 110. That is, the link portion 200 is provided forward of the recessed portion 110 of the base 100, the drive portion 300 is provided rearward of the recessed portion 110, and the drive portion 300 is provided to penetrate the recessed portion 110 and is connected to the link portion 200 so that the rotational power of the drive portion 300 may be transmitted to the link portion 200.

A mounting end portion 101 may be formed at a rear surface of the base 100 so that the drive portion 300 may be stably fixed. The link portion 200 and the drive portion 300 are respectively disposed forward and rearward of the base 100 so that the link portion 200 and the drive portion 300 may be directly connected to each other, and the installation space may be reduced.

Meanwhile, the link portion 200 may include a first link 210 and a second link 220. The first link 210 may be connected to the drive portion 300 and configured to rotate axially. The second link 220 may be rotatably connected to the skirt 400, and the first link 210 and the second link 220 may be rotatably connected to each other.

That is, the first link 210 is connected to the drive portion 300, the second link 220 is rotatably connected to the first link 210, and the skirt 400 is rotatably connected to the second link 220. Therefore, the position of the skirt 400 is adjusted as the first link 210 and the second link 220 rotate in conjunction with each other when the rotational power is generated by the drive portion 300. In the instant case, the first link 210, the second link 220, and the skirt 400 may be rotatably connected to one another by hinge structures.

As described above, the first link 210 is connected to the drive portion 300 and rotates axially, and the second link 220 rotates in conjunction with the rotation of the first link 210. That is, the first link 210 is directly connected to a driveshaft of the drive portion 300 and rotates axially. The position of the skirt 400 may be changed as the second link 220 rotates along the first link 210 in conjunction with the first link 210 in a state in which one end portion of the second link 220 is connected to the first link 210, and the other end portion of the second link 220 is connected to the skirt 400.

Therefore, the first and second links 210 and 220 may be positioned to overlap each other when the skirt 400 is retracted. The first and second links 210 and 220 may be positioned to be vertically unfolded in a completely deployed state as the first and second links 210 and 220 are unfolded and press the skirt 400 downward to deploy the skirt 400.

Figure 8:
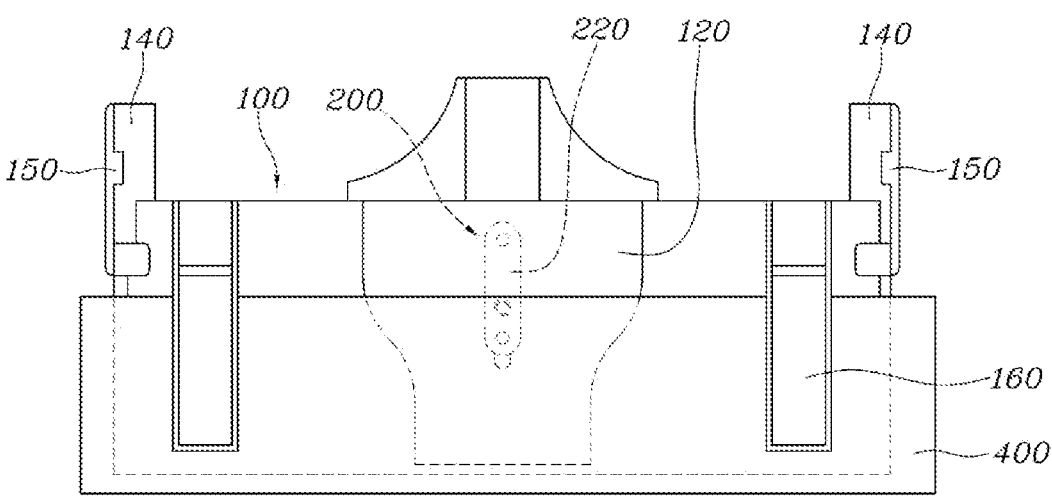
FIG. 8 is a view exemplarily illustrating a retracted state of the active air skirt apparatus illustrated in FIG. 1.

As illustrated in FIG. 8, when the first link 210 is positioned to be directed upward by the operation of the drive portion 300, the second link 220 moves the skirt 400 upward, and the first and second links 210 and 220 are positioned to overlap each other. When the skirt 400 is moved to the retracted position and the first and second links 210 and 220 are positioned to overlap each other, the positions of the links are stably fixed even though a force is applied in a gravitational direction so that the skirt 400 is prevented from being sagged and pushed by the weight of the skirt 400.

Figure 9:
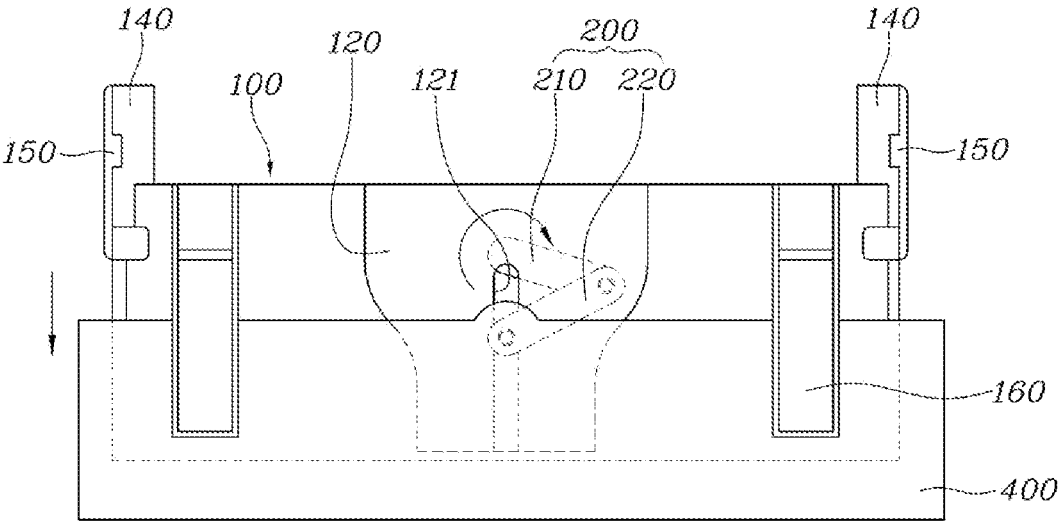
FIG. 9 is a view exemplarily illustrating a process of extending the active air skirt apparatus illustrated in FIG. 1.

In the instant case, as illustrated in FIG. 9, when the first link 210 is rotated downward by the operation of the drive portion 300 at the time of extending the skirt 400 from the retracted position, the second link 220 rotates away from the first link 210. In the instant case, the first and second links 210 and 220 rotate, and the first link 210 presses the second link 220 downward so that the second link 220 pushes the skirt 400 connected to the second link 220. Therefore, even though vehicle-induced wind is applied to the skirt 400, the position of the skirt 400 may be stably moved by a force generated by the rotations of the first and second links 210 and 220.

Figure 10:
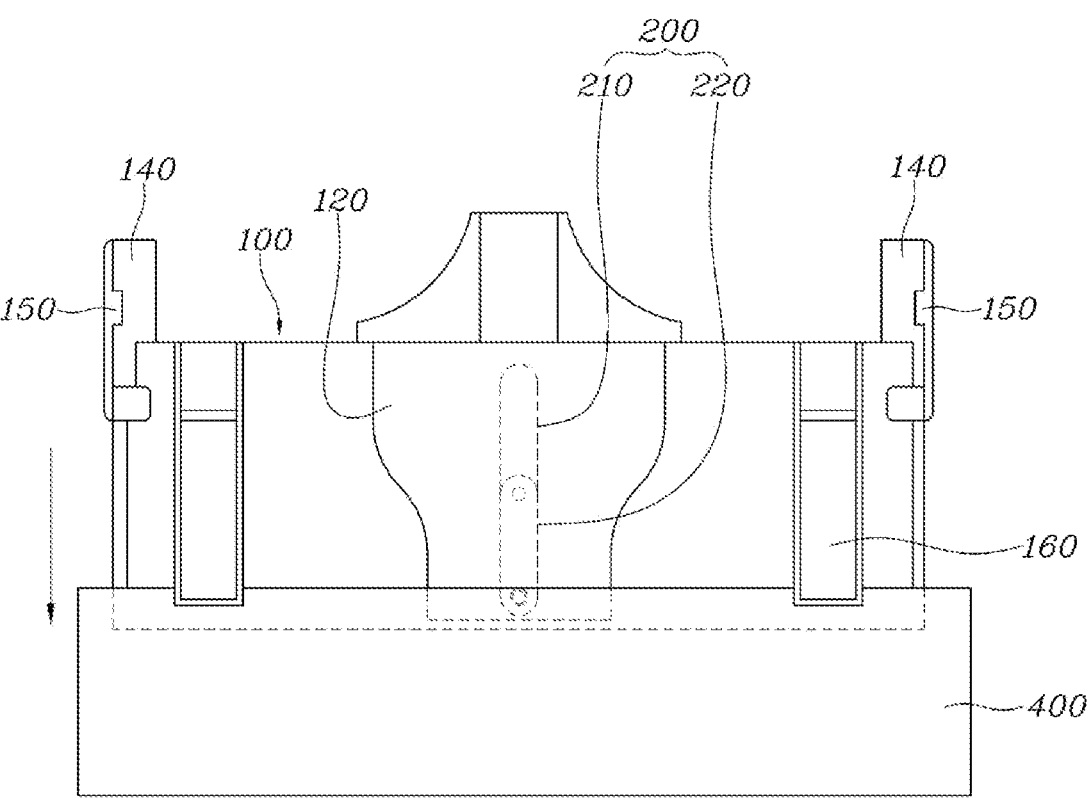
FIG. 10 is a view exemplarily illustrating an extended state of the active air skirt apparatus illustrated in FIG. 1.

When the skirt 400 is completely extended as described above, the first and second links 210 and 220 are completely unfolded and positioned on a straight line, as illustrated in FIG. 10. Because the first and second links 210 and 220 are vertically positioned as described above, the skirt 400 is prevented from being sagged by the weight of the skirt 400, and a supporting force is ensured by the arrangement of the first and second links 210 and 220 on the straight line. Therefore, the position of the skirt 400 is stabilized even though an external force is applied.

Meanwhile, the skirt 400 may include a connection portion 410 formed at an upper end portion of a center portion thereof, and the connection portion 410 and the second link 220 of the link portion 200 may be rotatably connected. The second link 220 of the link portion 200 may be rotatably connected to the connection portion 410 by a hinge structure.

The connection portion 410, to which the second link 220 of the link portion 200 is connected, is formed at the center portion of the skirt 400 as described above so that a force, which is generated by the rotations of the links of the link portion 200, is applied to the center portion of the skirt 400 when the link portion 200 rotates. Therefore, the skirt 400 may stably move upward or downward without being tilted toward any one side thereof. Furthermore, the connection portion 410 is formed at the upper end portion of the center portion of the skirt 400, an influence of an airflow is avoided when the mobility vehicle travels. The second link 220 of the link portion 200 is rotatably connected to the connection portion 410 by the hinge structure so that the skirt 400 may be moved upward or downward by being lifted upward or pushed downwardly in conjunction with the rotations of the links.

Meanwhile, a first cover 120 may be formed to cover the recessed portion 110 and coupled to the front surface of the base 100, and the first cover 120 may include a through-hole 121 penetrated by the connection portion 410.

The first cover 120 is coupled to the front surface of the base 100 and formed to be matched with the recessed portion 110. The first cover 120 covers and seals the recessed portion 110 to protect the link portion 200, which is provided in the recessed portion 110, from outside contamination or impact.

The through-hole 121 is formed in the first cover 120 so that a connection portion where the connection portion 410 of the skirt 400 and the second link 220 of the link portion 200 are connected may move. The through-hole 121 may extend upwards from a lower end portion of the first cover 120 because the skirt 400 needs to move in the upward and downward direction thereof. Furthermore, because the through-hole 121 of the first cover 120 extends upwards from the lower end portion, the first cover 120 may be assembled to the base 100 by moving the first cover 120 from above to below in a state in which the link portion 200 and the skirt 400 are connected to the base 100.

A guide portion 130 is provided on the first cover 120 and extends along the through-hole 121, and the guide portion 130 is connected to an axial center portion of the first link 210. The guide portion 130 includes a slit hole 131 extending along the through-hole 121, and the connection portion 410 and the second link 220 may be rotatably connected to each other while penetrating the through-hole 121 and the slit hole 131.

The guide portion 130 may be coupled to a rear surface of the first cover 120 and extend in the upward and downward direction along the through-hole 121. The guide portion 130 includes a larger width than the through-hole 121 so that the guide portion 130 may be coupled to the first cover 120.

The guide portion 130 is connected to the axial center portion of the first link 210 when the first cover 120 is mounted on the base 100 so that the separation of the first link 210 may be prevented, and the first link 210 may stably rotate.

Furthermore, because the guide portion 130 includes the slit hole 131 formed along the through-hole 121, the connection portion where the connection portion 410 of the skirt 400 and the second link 220 are connected may move along the slit hole 131. That is, the connection portion 410 of the skirt 400 and the second link 220 may be rotatably connected to each other by a pin as a hinge structure. The pin may penetrate the through-hole 121 and the slit hole 131 and connect the connection portion 410 and the second link 220, and the upward and downward motions of the skirt 400 may be guided as the pin rectilinearly moves in the slit hole 131.

As described above, the first cover 120 includes the guide portion 130, and the connection portion where the connection portion 410 of the skirt 400 and the second link 220 of the link portion 200 are connected is guided to move only in the upward and downward direction by the guide portion 130 so that the upward and downward motions of the skirt 400 may be stabilized, and the skirt 400 may be prevented from being distorted by an external force or vibration.

Meanwhile, the skirt 400 may have sliders 420 extending upwards from upper end portions of two opposite sides of the skirt 400, and seating portions 140 may be formed at two opposite sides of the base 100 and extending upwards from lower end portions of the base 100 so that the sliders 420 are accommodated in the seating portions 140.

As described above, the pair of sliders 420 may be provided at the two opposite sides of the skirt 400, and the seating portions 140 are provided at the two opposite sides of the base 100 so that the sliders 420 are accommodated in the seating portions 140 so that the sliders 420 move in the upward and downward direction in the seating portion 140.

As described above, because the pair of sliders 420 is provided at the two opposite sides of the skirt 400, the skirt 400 may be prevented from being tilted toward any one side thereof. Furthermore, because the sliders 420 respectively move along the seating portions 140, the skirt 400 may be stably retracted or extended.

In the instant case, the seating portion 140 may include a protrusion 145 or a groove extending in the upward/downward direction, and the slider 420 may include a groove 155 or protrusion extending in the upward and downward direction and matched with the seating portion 140.

Figure 6:
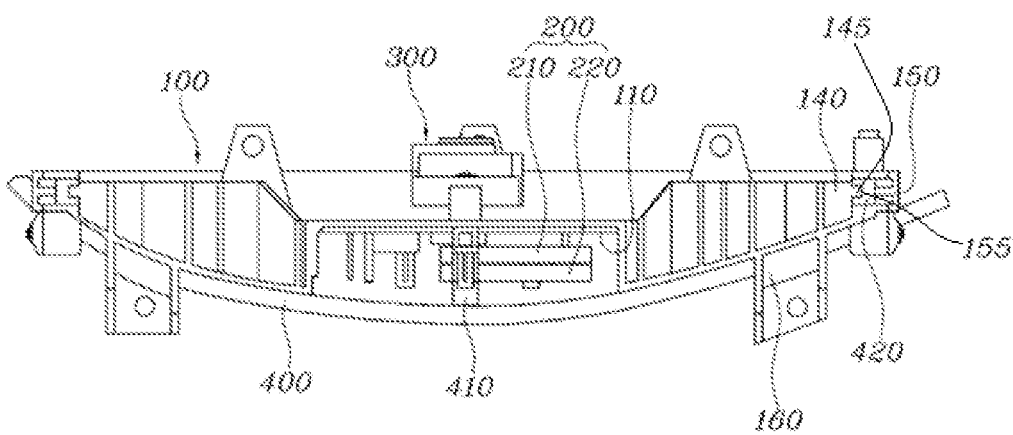
FIG. 6 is a top cross-sectional view of the active air skirt apparatus illustrated in FIG. 1.
Figure 7:
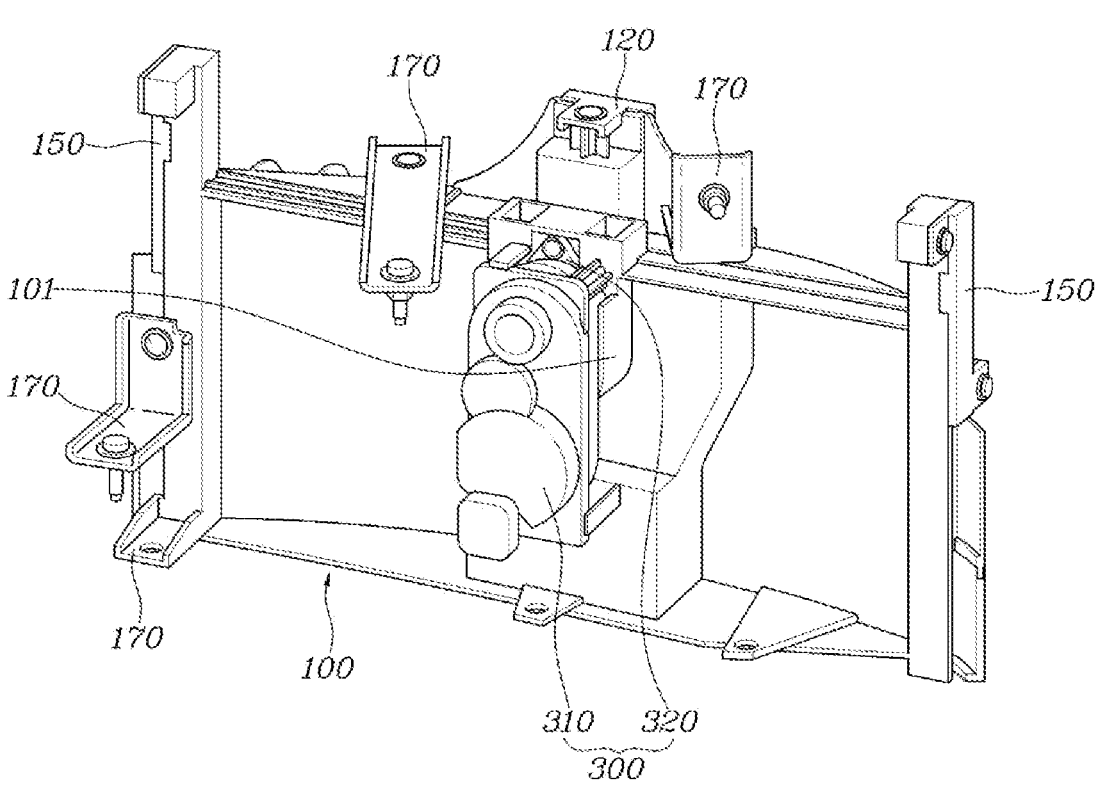
FIG. 7 is a rear view of the active air skirt apparatus illustrated in FIG. 1.

For example, as illustrated in FIG. 6, the seating portion 140 of the base 100 may include a protrusion extending upward and downward, and the slider 420 of the skirt 400 may include a groove extending upward and downward to be inserted into the protrusion so that the slider 420 may be kept connected to the seating portion 140, and the slider 420 may slide in an extension direction of the seating portion 140. Furthermore, the slider 420 of the skirt 400 may be inserted into and connected to the seating portion 140 of the base 100 so that the separation of the slider 420 may be prevented, and the skirt 400 may be structurally stabilized.

Meanwhile, second covers 150 may be coupled to two opposite sides of the base 100, and the second covers 150 may be formed to surround the sliders 420 inward when the second covers 150 are coupled to the base 100.

As described above, the second covers 150 are formed to surround the sliders 420 when the second covers 150 are coupled to the base 100. Therefore, the sliders 420 are disposed in the second covers 150 and move along the seating portions 140. Therefore, the second covers 150 protect the sliders 420 from outside contamination or impact, and the second covers 150 surround the slider 420 so that the sliders 420 are not separated from the seating portions 140, which ensures operational stability.

Furthermore, the base 100 may have support portions 160 bent downward and forward and extending, and the skirt 400 may be positioned inside the support portions 160.

As described above, the support portions 160 are provided on the front surface of the base 100, and the support portions 160 are bent and extend downwardly from the front surface of the base 100 so that the skirt 400 is inserted into the support portions 160. Therefore, in a state in which the skirt 400 is inserted into the support portions 160, the forward and rearward motions of the skirt 400 are restricted, and the skirt 400 is allowed to move only in the upward and downward direction in which the support portions 160 extend so that the skirt 400 may rectilinearly move in the upward and downward direction thereof.

Meanwhile, the support portions 160 may be fastened and fixed to the vehicle body, the bumper, or the undercover, and a plurality of mounting portions 170 is provided around the base 100 so that the base 100 and fastened and fixed to the vehicle body or the bumper by the mounting portions 170.

Therefore, the base 100 may be kept securely provided and fixed to the vehicle body, and the base 100 may be provided inside the bumper without being exposed.

The base 100 may be fastened and fixed to the vehicle body, the bumper, or the undercover by the plurality of mounting portions 170. The mounting portion 170 may be configured as a bracket and fastened and fixed to the vehicle body, the bumper, or the undercover by bolting.

Furthermore, end portions of the support portions 160 may also be fastened and fixed to the vehicle body or the bumper so that the coupling rigidity may be ensured, and the base 100 may be securely fixed to the vehicle body or the bumper by the support portions 160.

Therefore, the base 100 may be kept securely fixed as the base 100 is disposed on the lower portion of the mobility vehicle and fastened to any at least one of the vehicle body, the bumper cover, and the undercover.

Meanwhile, the skirt 400 includes an upper end portion 400a and a lower end portion 400b. The upper end portion 400a may be configured as a rigid body and connected to the link portion 200, and the lower end portion 400b may be coupled to the upper end portion 400a and configured to be elastically deformed.

The upper end portion 400a of the skirt 400 may include rigid reinforced plastic, and the lower end portion 400b may be made of an elastically deformable rubber material. Therefore, because the upper end portion 400a is configured as a rigid body, the skirt 400 may be securely connected to the link portion 200, and the rigidity of the guide structure for the base 100 may be ensured, and the guide structure may be structurally stabilized. Furthermore, because the lower end portion 400b is elastically deformable, the skirt 400 may be prevented from being damaged even though impact is applied from the road surface. The occurrence of noise even though stones bounce off and collide with the mobility vehicle.

As described above, the skirt 400 may be divided into the upper end portion 400a and the lower end portion 400b, and the upper end portion 400a and the lower end portion 400b may be coupled to each other by insertion.

The active air skirt apparatus 400 structured as described above ensures optimal aerodynamic performance by controlling an airflow flowing under the mobility vehicle in accordance with the traveling state of the mobility vehicle. Furthermore, the skirt 400 for controlling the airflow stably moves even when the mobility vehicle travels at a high speed (i.e., a speed higher than a predetermined speed). Even though vehicle-induced wind is applied to the skirt 400, the supporting force is ensured, and durability and reliability are improved.

While the predetermined embodiments of the present disclosure have been illustrated and described, it will be obvious to those skilled in the art that the present disclosure may be variously modified and changed without departing from the technical spirit of the present disclosure defined in the appended claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An active air skirt apparatus comprising:
a base fixed to a vehicle body;
a link portion including a plurality of links connected to be rotatable in a transverse direction thereof;
a drive portion mounted on the base, connected to the links of the link portion, and configured to generate rotational power to rotate the plurality of links; and
a skirt provided on the base connected to the links of the link portion and configured to move in an upward and downward direction,
wherein the skirt is configured to be moved to a retracted position based on the plurality of links being folded by operation of the drive portion, and moved to an extended position based on the plurality of links being unfolded,
wherein the skirt includes sliders extending upwards from upper end portions of first and second opposite sides of the skirt, and
wherein seating portions are provided at first and second opposite sides of the base and extend upwards from lower end portions of the base so that the sliders are engaged in the seating portions.

2. The active air skirt apparatus of claim 1, wherein the base includes a recessed portion that defines a space in which the links of the link portion are accommodated and rotated.

3. The active air skirt apparatus of claim 2, wherein the recessed portion is formed in a front surface of the base, the link portion is provided forward of the base, the drive portion is provided on a rear surface of the recessed portion, and the drive portion is provided to penetrate the recessed portion and is connected to the link portion.

4. The active air skirt apparatus of claim 2, wherein the link portion includes a first link and a second link, a first end portion of the first link is connected to the drive portion and configured to rotate by the drive portion, a first end portion of the second link is rotatably connected to the skirt, and a second end portion of the first link and a second end portion of the second link are rotatably connected to each other.

5. The active air skirt apparatus of claim 4, wherein a connection portion is provided at an upper end portion of a center portion of the skirt, and the connection portion and the first end portion of the second link are rotatably connected.

6. The active air skirt apparatus of claim 5, further including a first cover coupled to the front surface of the base and formed to cover the recessed portion, and the first cover includes a through-hole penetrated by the connection portion.

7. The active air skirt apparatus of claim 6, further including a guide portion provided on the first cover and extending along the through-hole,
   wherein the guide portion is connected to an axial center portion of the first link and includes a slit hole extending along the through-hole, and
   wherein the connection portion and the first end portion of the second link are rotatably connected while penetrating the through-hole and the slit hole.

8. The active air skirt apparatus of claim 4,
   wherein for the retracted position of the skirt, the first and second links are positioned to overlap each other and thus the skirt is retracted, and
   wherein for the extended position of the skirt, the first and second links press the skirt downward while being unfolded and thus the skirt is deployed.

9. The active air skirt apparatus of claim 8,
   wherein the first and second links are positioned to be vertically unfolded in a completely deployed state.

10. The active air skirt apparatus of claim 1, wherein the seating portion includes a protrusion or a groove extending in an upward and downward direction, and the slider includes a groove or a protrusion matched with the seating portion and extending in the upward and downward direction.

11. The active air skirt apparatus of claim 1, wherein second covers are coupled to the first and second opposite sides of the base, respectively, and the second covers are formed to surround the sliders inward in a state that the second covers are coupled to the base.

12. The active air skirt apparatus of claim 1, wherein the base includes a support portion bent downward in a predetermined length from a front surface of the base and bent forward in a predetermined length and the skirt is positioned between the base and the support portion.

13. The active air skirt apparatus of claim 12, wherein the support portion is fastened and fixed to the vehicle body, a bumper, or an undercover, a plurality of mounting portions are provided around the base, and the base is fastened and fixed to the vehicle body, the bumper, or the undercover by the mounting portions.

14. The active air skirt apparatus of claim 1,
   wherein the skirt includes an upper end portion and a lower end portion,
   wherein the upper end portion is connected to the link portion, and the lower end portion is coupled to the upper end portion.

15. An active air skirt apparatus comprising:
   a base fixed to a vehicle body;
   a link portion including a plurality of links connected to be rotatable in a transverse direction thereof;
   a drive portion mounted on the base, connected to the links of the link portion, and configured to generate rotational power to rotate the plurality of links; and
   a skirt provided on the base connected to the links of the link portion and configured to move in an upward and downward direction,
   wherein the skirt is configured to be moved to a retracted position based on the plurality of links being folded by operation of the drive portion, and moved to an extended position based on the plurality of links being unfolded, and
   wherein the base includes a support portion bent downward in a predetermined length from a front surface of the base and bent forward in a predetermined length and the skirt is positioned between the base and the support portion.

16. An active air skirt apparatus comprising:
   a base fixed to a vehicle body;
   a link portion including a plurality of links connected to be rotatable in a transverse direction thereof;
   a drive portion mounted on the base, connected to the links of the link portion, and configured to generate rotational power to rotate the plurality of links; and
   a skirt provided on the base connected to the links of the link portion and configured to move in an upward and downward direction,
   wherein the skirt is configured to be moved to a retracted position based on the plurality of links being folded by operation of the drive portion, and moved to an extended position based on the plurality of links being unfolded,
   wherein the base includes a recessed portion that defines a space in which the links of the link portion are accommodated and rotated, and wherein the recessed portion is formed in a front surface of the base, the link portion is provided forward of the base, the drive portion is provided on a rear surface of the recessed portion, and the drive portion is provided to penetrate the recessed portion and is connected to the link portion.

* * * * *